(12) United States Patent
Itai et al.

(10) Patent No.: US 10,589,814 B2
(45) Date of Patent: Mar. 17, 2020

(54) INVERTED PENDULUM VEHICLE

(71) Applicant: HONDA MOTOR CO., LTD., Minato-Ku, Tokyo (JP)

(72) Inventors: Ryosuke Itai, Wako (JP); Seiji Kato, Kawagoe (JP)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 15/955,986

(22) Filed: Apr. 18, 2018

(65) Prior Publication Data

US 2018/0304953 A1 Oct. 25, 2018

(30) Foreign Application Priority Data

Apr. 20, 2017 (JP) .................. 2017-083514

(51) Int. Cl.
| | |
|---|---|
| *B62K 11/00* | (2006.01) |
| *B62J 23/00* | (2006.01) |
| *B62J 1/08* | (2006.01) |
| *B62K 1/00* | (2006.01) |
| *B62J 25/00* | (2020.01) |
| *B62H 1/02* | (2006.01) |

(52) U.S. Cl.
CPC .............. *B62K 11/007* (2016.11); *B62J 1/08* (2013.01); *B62J 23/00* (2013.01); *B62K 1/00* (2013.01); *B62H 1/02* (2013.01); *B62J 25/00* (2013.01)

(58) Field of Classification Search
CPC ...................................... B62K 11/07
See application file for complete search history.

(56) References Cited

U.S. PATENT DOCUMENTS

| | | | |
|---|---|---|---|
| 9,085,334 B2 * | 7/2015 | Hoffmann | B62K 1/00 |
| 9,796,444 B1 * | 10/2017 | Lin | B62K 15/006 |
| 10,137,956 B2 * | 11/2018 | Echizenya | B62J 6/00 |
| 2014/0353051 A1 | 12/2014 | Yada et al. | |
| 2018/0154971 A1 * | 6/2018 | Zuo | B62H 1/02 |
| 2018/0304954 A1 * | 10/2018 | Murakami | B62K 1/00 |

FOREIGN PATENT DOCUMENTS

JP 2014-234036 A 12/2014

* cited by examiner

*Primary Examiner* — Kevin Hurley
(74) *Attorney, Agent, or Firm* — Carrier Blackman & Associates, P.C.; Joseph P. Carrier; William D. Blackman (57) ABSTRACT

An inverted pendulum vehicle (10) comprises a main wheel (14) configured to be driven under an inverted pendulum control, a vehicle body frame (30) supporting the main wheel, an outer shell (12) covering the vehicle body frame, and a seat (16) mounted on the vehicle body frame in a vertically adjustable manner for seating a rider of the vehicle, wherein the seat is provided with an extension (92) extending downward therefrom along a front side of the outer shell, and the vehicle body frame is provided with a projection (102) projecting forward from the vehicle body frame and passed through a front part of the outer shell, the projection being provided with a free end configured to contact a rear side of the extension.

7 Claims, 10 Drawing Sheets

INVERTED PENDULUM VEHICLE

TECHNICAL FIELD

The present invention relates to an inverted pendulum vehicle, and in particular to an inverted pendulum vehicle provided with a seat or a saddle for a rider.

BACKGROUND ART

JP2014-234036A discloses an inverted pendulum vehicle comprising a main wheel driven under an inverted pendulum control principle, a vehicle body frame supporting the main wheel, an outer shell covering the vehicle body frame, and a saddle provided in an upper end part of the vehicle body frame for seating a rider of the vehicle so as to be adjustable in the vertical direction. In such a vehicle, the saddle may be provided with an extension extending downward along the front part of the outer shell to provide a guide surface for the legs of the rider in getting seated, and afford the rider a stable ride by allowing the rider to grip the front part of the vehicle with the legs. Such an extension may also enhance the external appearance of the vehicle.

However, such an extension may create a part having a relatively low mechanical strength. The front part of the vehicle which may include the extension is more likely to collide with objects around the vehicle than other parts of the vehicle. The impact applied to the extension may be transmitted to the outer shell which typically lacks a mechanical strength.

SUMMARY OF THE INVENTION

A primary object of the present invention is to provide an inverted pendulum vehicle equipped with a front extension of a seat which demonstrates a high mechanical strength.

A second object of the present invention is to provide such a front extension that can prevent the impact of a crash from being transmitted to an outer shell of the vehicle.

To achieve such an object, the present invention provides an inverted pendulum vehicle (10), comprising: a main wheel (14) configured to be driven under an inverted pendulum control; a vehicle body frame (30) supporting the main wheel; an outer shell (12) covering the vehicle body frame; and a seat (16) mounted on the vehicle body frame in a vertically adjustable manner for seating a rider of the vehicle; wherein the seat is provided with an extension (92) extending downward therefrom along a front side of the outer shell, and the vehicle body frame is provided with a projection (102) projecting forward from the vehicle body frame and passed through a front part of the outer shell, the projection being provided with a free end configured to contact or oppose with a certain gap a rear side of the extension.

In the above arrangement, the projection projecting forward from the vehicle body frame and passed through the front part of the outer shell to contact or oppose the rear side of the extension of the seat improves the mechanical strength of the extension. Further, the impact of a frontal crash is transmitted from the extension to the projection, and then to the vehicle body frame. Therefore, the impact is prevented from being applied to the outer shell so that a damage to the outer shell can be avoided.

The projection may comprise a main body made of a metallic tube (102A), and a plug (102B) made of elastomeric material and attached to a free end of the main body.

Thereby, the front end of the main body (metallic tube) is protected by the elastomeric plug, and the impact of a crash can be absorbed by the elastic deformation of the plug.

According to a preferred embodiment of the present invention, a guide mechanism (98, 100) is provided between the front side of the outer shell and the extension, the guide mechanism being configured to restrict a lateral movement of the extension relative to the outer shell, and permit a vertical movement of the extension relative to the outer shell.

Thereby, the guide mechanism not only supports the seat in a stable manner but also serves as a guide for the vertical adjustment of the seat. Typically, the seat is provided with a column depending therefrom, and slidably retained by the vehicle body frame.

Preferably, the guide mechanism comprises a first linear rail (98) extending vertically on the front side of the outer shell, and a second linear rail (100) extending vertically on the extension opposite to the first linear rail and slidably engaged by the first linear rail.

Thereby, the seat can be guided by the guide mechanism in a stable manner.

Preferably, the outer shell is provided with a pair of ribs extending vertically along the front side thereof, the first linear rail being formed by side surfaces of the ribs, the projection being positioned between the ribs, and projecting beyond front surfaces of the ribs.

The first linear rail can be provided in an economical manner, and the ribs additionally perform the function of reinforcing the outer shell.

According to a preferred embodiment of the present invention, the inverted pendulum vehicle further comprises a pair of stand legs supported by the vehicle body frame and projecting forward from either side of a front part of the outer shell, and the projection is positioned and dimensioned such that the vehicle can be supported on a ground surface at the projection and the stand legs in a stable manner when the seat is removed from the vehicle.

Thereby, the vehicle can be placed on the ground surface for servicing and other purposes in a stable manner by supporting the vehicle at three points given by the projection and the stand legs.

The extension of the seat according to the present invention thus favorably protects a front part of the vehicle at the time of a frontal crash.

DESCRIPTION OF THE PREFERRED EMBODIMENT(S)

An embodiment of an inverted pendulum vehicle according to the present invention is described in the following with reference to FIGS. 1 to 10.

Figure 1:
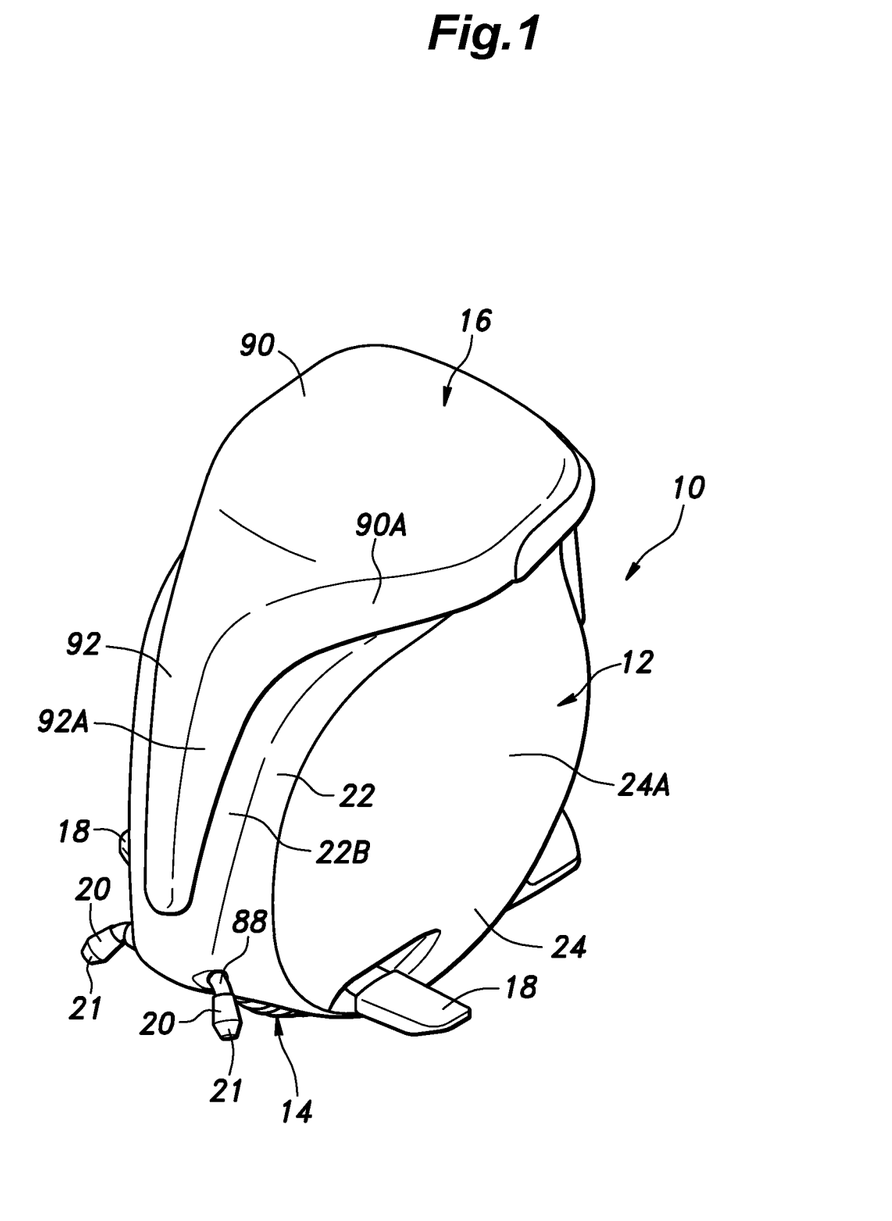
FIG. 1 is a perspective view of an inverted pendulum vehicle according to an embodiment of the present invention with a seat lowered.
Figure 2:
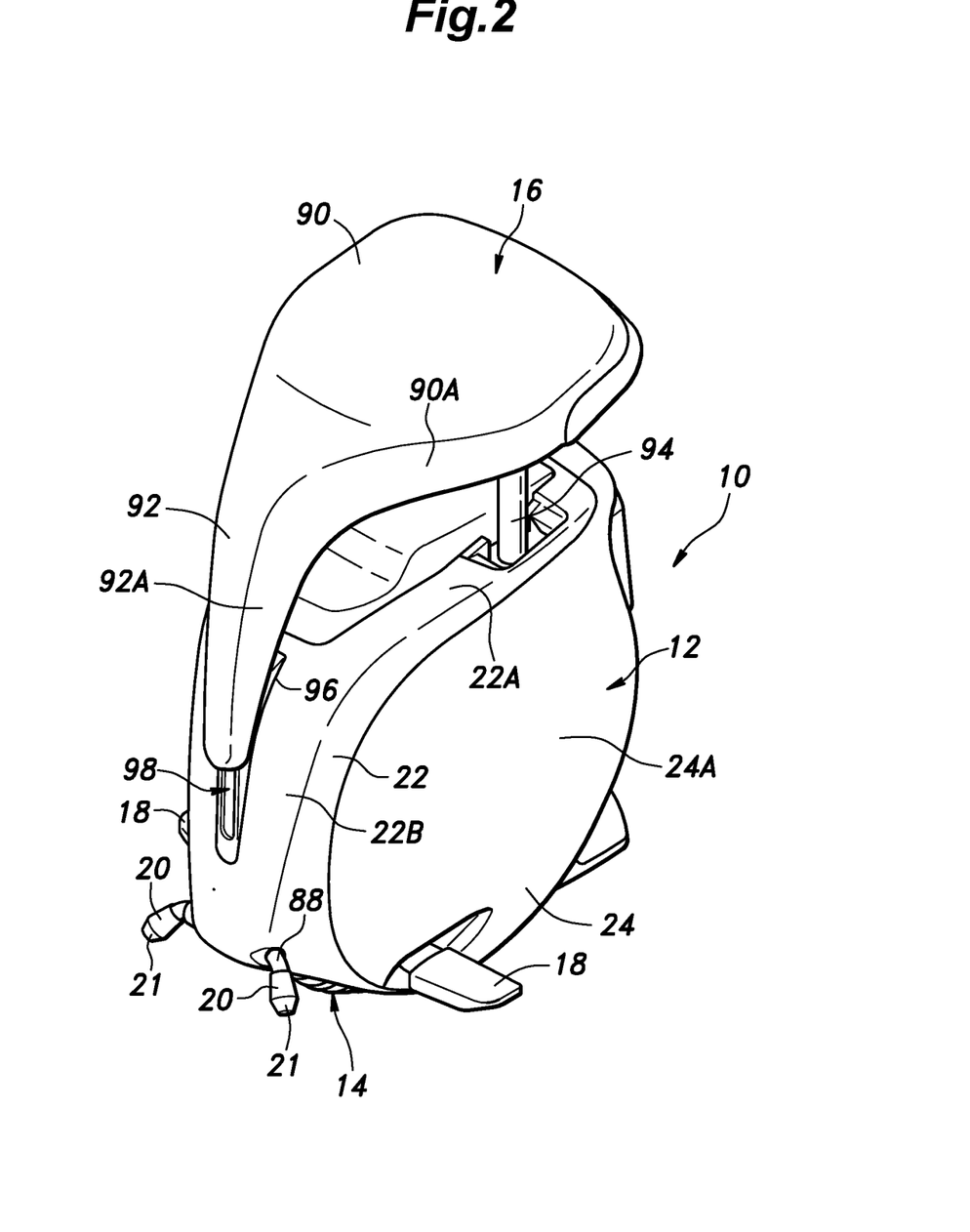
FIG. 2 is a view similar to FIG. 1 with the seat raised.
Figure 3:
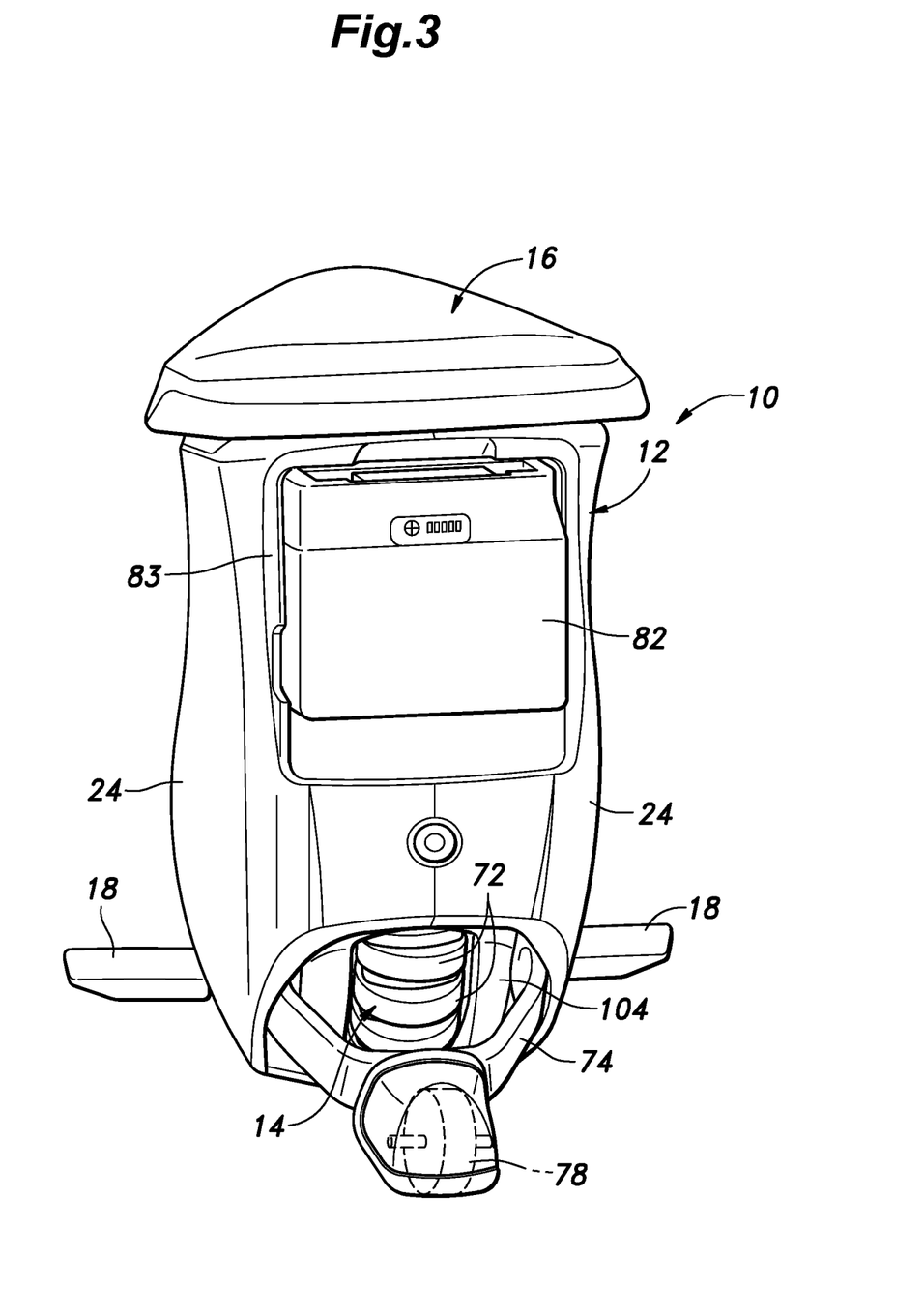
FIG. 3 is a rear perspective view of the inverted pendulum vehicle.

As shown in FIGS. 1 to 3, the inverted pendulum vehicle 10 includes an outer shell 12, a main wheel 14 covered by the outer shell 12 and partly protruding downward from a bottom opening of the outer shell 12 to engage the ground surface, a saddle 16 provided atop the outer shell 12 and configured to seat a rider, a pair of foot rests extending laterally from either side of the outer shell 12 to support the feet of the rider, and a pair of stand legs 20 projecting forward from a lower part of the outer shell 12.

The outer shell 12 consists of a thin shell made of plastic material, and as shown in FIGS. 1 to 4, includes a main member 22 forming an upper wall 22A and a front wall 22B, and a pair of side members 24 forming respective side walls 24A. The outer shell 12 covers a body frame 30, and a drive mechanism mounted on the body frame 30 for driving the main wheel 14. The outer shell 12 further includes an under cover 104 that covers a large part of the main wheel 14.

Figure 7:
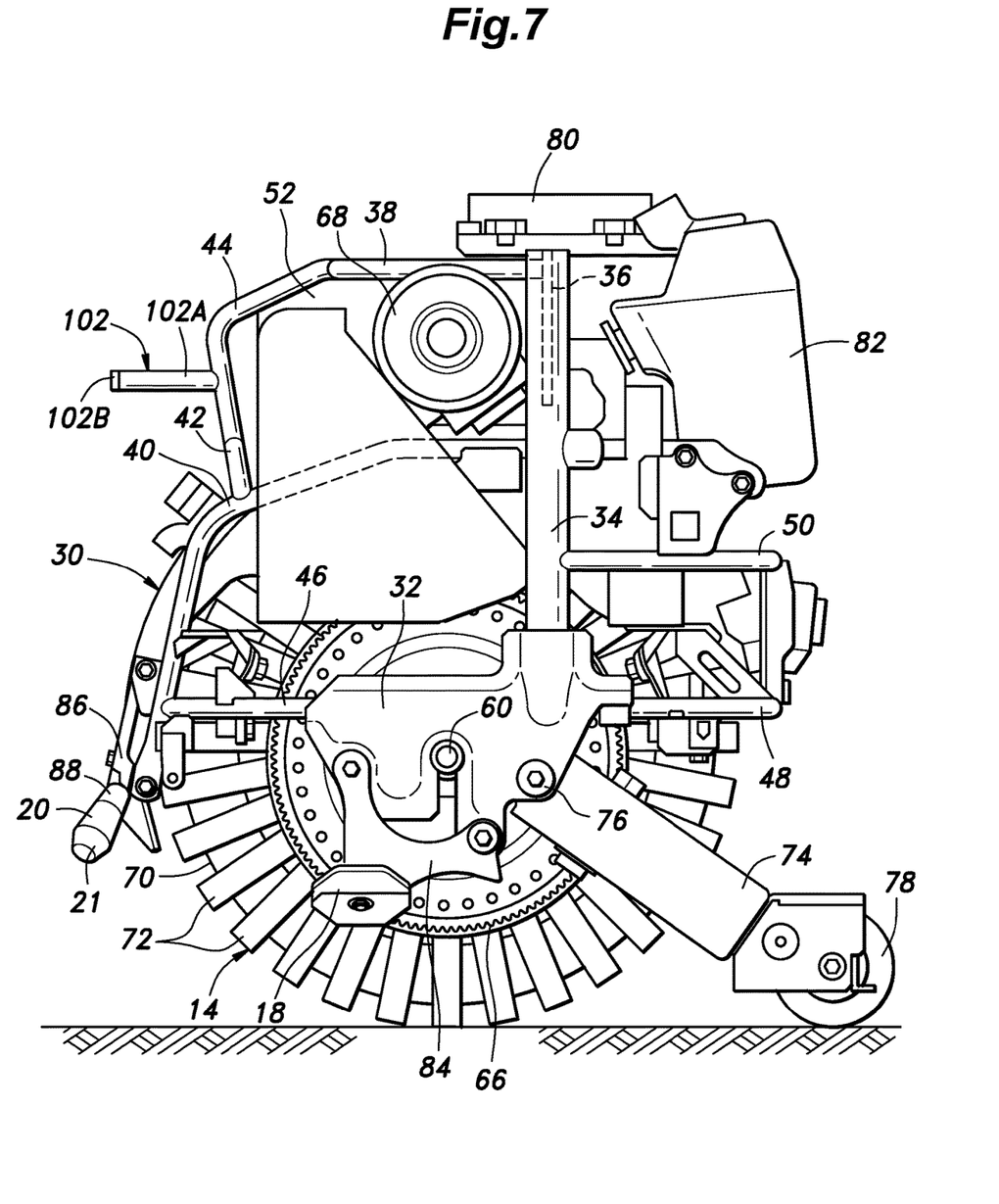
FIG. 7 is a side view showing an internal structure of the inverted pendulum vehicle.

The vehicle body frame 30 is generally made of metallic material, and as shown in FIG. 7, includes a pair of lower side plates 32 each consisting of stamp formed sheet metal, a pair of main posts 34 each consisting of a pipe member having a lower end connected to the corresponding side plate 32 and extending vertically, an upper plate 36 connected between upper end parts of the main posts 34, an upper pipe 38 provided with a U shape in plan view and having bifurcated rear ends connected to the upper plate 36, and a pair of side pipes 40 each having a rear end connected to a corresponding end part of a middle cross member (not shown in the drawings) connected between intermediate parts of the main posts 34 and extending forward and then downward. The vehicle body frame 30 further includes a front cross pipe 42 connected between front parts of the side pipes 40, a front center pipe 44 having an upper end connected centrally to a front end of the upper pipe 38 and a lower end connected centrally to the front cross pipe 42, a pair of front side pipes 46 each having a rear end connected to the corresponding lower side plate 32 and a front end connected to a lower end part of the corresponding side pipe 40, a staple-shaped first rear cross pipe 48 having a cross piece extending laterally behind the main wheel 14 and a pair of legs extending forward from the cross piece and connected to the respective side plates 32, and a staple-shaped second rear cross pipe 50 having a cross piece extending laterally directly above the cross piece of the first rear cross pipe 48 and a pair of legs extending forward from the cross piece and connected to intermediate parts of the respective main posts 34.

Figure 8:
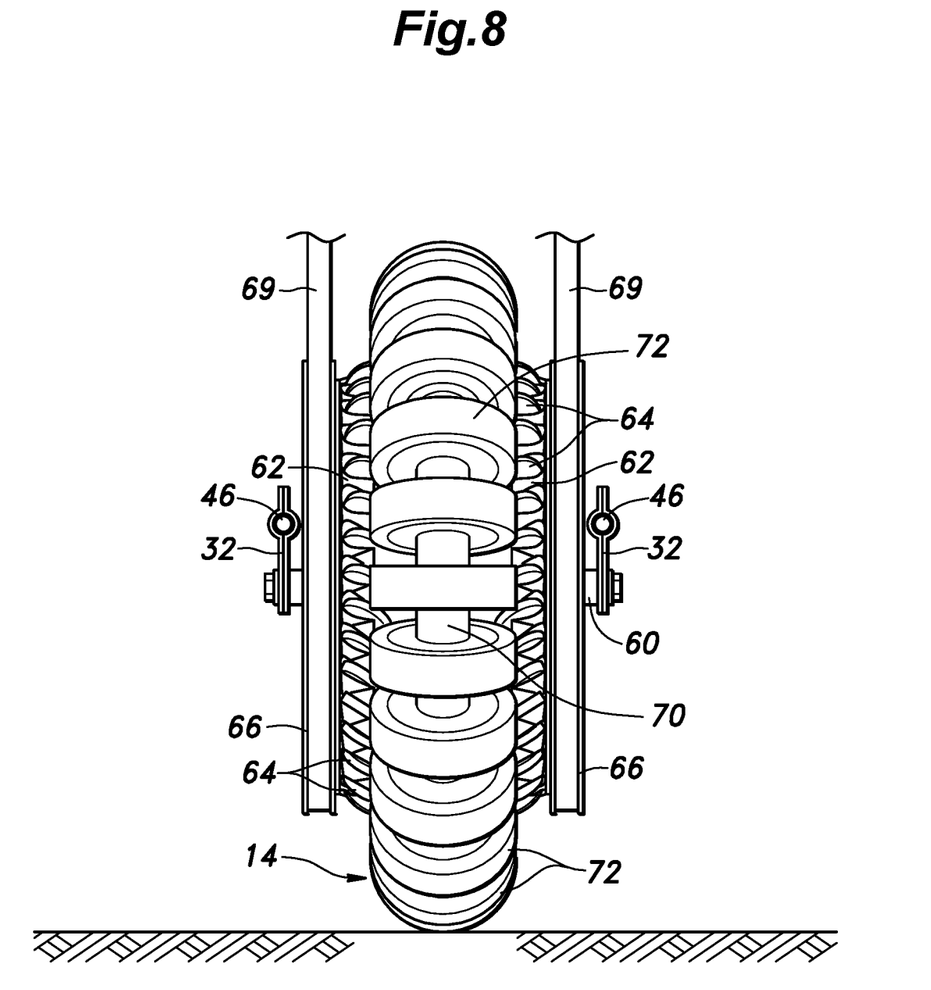
FIG. 8 is a fragmentary front view of the internal structure of the inverted pendulum vehicle.

The lower side plates 32 support corresponding ends of a disk support shaft 60 extending laterally as shown in FIGS. 7 and 8. The disk support shaft 60 supports a pair of drive disks 63 inward of the lower side plates 32 in an individually rotatable manner.

Each drive disk 62 supports a plurality of metallic drive rollers 64 along the circumferential direction. The rotational center lines of the drive rollers 64 are in a skewed relationship to the rotational center line of the drive disk. The two drive disks 62 are mirror images of each other.

Each drive disk 62 is fitted with a large driven pulley 66 on an outer side thereof in a coaxial relationship. A pair of drive units 68 are mounted on the upper pipe 38 via a motor mount plate 52. Each drive unit 68 includes an electric motor and a gear reduction mechanism, and the output shaft of the gear reduction mechanism is fitted with a small drive pulley (not shown in the drawings). A cogged belt 69 is passed around each driven pulley 66 and the corresponding drive pulley so that the two drive disks 62 can be individually driven by the respective drive units 68.

The main wheel 14 is provided with a metallic annular member 70 and a plurality of driven rollers 72 rotatably mounted on the annular member 70. Each driven roller 72 is provided with a metallic hub, and a rubber tire attached to the outer periphery of the metallic hub. These driven rollers 72 are rotatably supported by the annular member 70 so as to be rotatable around the corresponding tangential lines of the annular member 70.

The driven rollers 72 are interposed between the two sets of drive rollers 64 supported by the respective drive disks 62 so that the main wheel 14 is rotatably held between the two drive disks 62 without requiring a rotary shaft.

A tail wheel arm 74 is pivotally connected to the lower side plates 32 so as to be rotatable around a laterally extending rotational center line. The tail wheel arm 74 is provided with the shape of letter U, and is provided with a cross piece and a pair of legs. The free ends of the legs are pivotally connected to the respective lower side plates 32, and the cross piece rotatably supports a tail wheel 78 via a bracket.

An electric box 80 is mounted on an upper end of the upper pipe 38. The electric box 80 houses a gyro sensor and a computer for performing an inverted pendulum control, and a main wheel PDU (power drive unit) for supplying electric power to the drive units 68 under the inverted pendulum control. A battery pack 82 for supplying electric power to the electronic devices in the electric box 80 and the drive units 68 is detachably attached to an upper rear end part of the vehicle body frame 30.

The drive units 68 are thus controlled in such a manner that the inverted pendulum vehicle 10 is enabled to travel in any desired direction while maintaining an upright posture as commanded by the rider shifting his body weight toward the desired direction.

The foot rests 18 are attached to the respective lower side plates 32 via respective foot rest mount members 84.

A laterally extending mount pipe 88 is attached to lower end part of the side pipes 40 via a mount plate 86. The stand legs 20 are connected to the respective end parts of the mount pipe 88, and extend in a downward and outward direction. The free ends of the stand legs 20 are each fitted with a rubber cap 21.

The saddle 16 is made of a molded plastic member, and as shown in FIGS. 1 and 2, includes a main part 90 shaped like a saddle of a motorcycle and extending substantially above and along the upper wall 22A of the outer shell 12 to seat a rider, and an extension 92 extending integrally from a front end of the main part 90 in a substantially downward direction in front of and along the front wall 22B of the outer shell 12.

The lower side of the saddle main part 90 is attached to upper ends of a pair of saddle columns 94 which are slidably received in the main posts 34. By using a suitably locking mechanism which will be described hereinafter, the vertical position of the saddle main part 90 can be adjusted by locking the saddle columns 94 to the main posts 34 so that the saddle 16 can be vertically adjusted to any position relative to the vehicle body frame 30 between a lowered position shown in FIG. 1 and a raised position shown in FIG. 2.

A battery mounting plate 83 is fixedly attached to an upper rear end part of the vehicle body frame 30, and is exposed toward the rear end of the vehicle 10 via a rectangular opening in the outer shell 12. A battery pack 82 (see FIG. 3) is detachably attached to the battery mounting plate 83. The battery mounting plate 83 is provided with an electric connector and a mechanical latch for establishing an electric connection and detachably retaining the battery pack 82, respectively.

Figure 9:
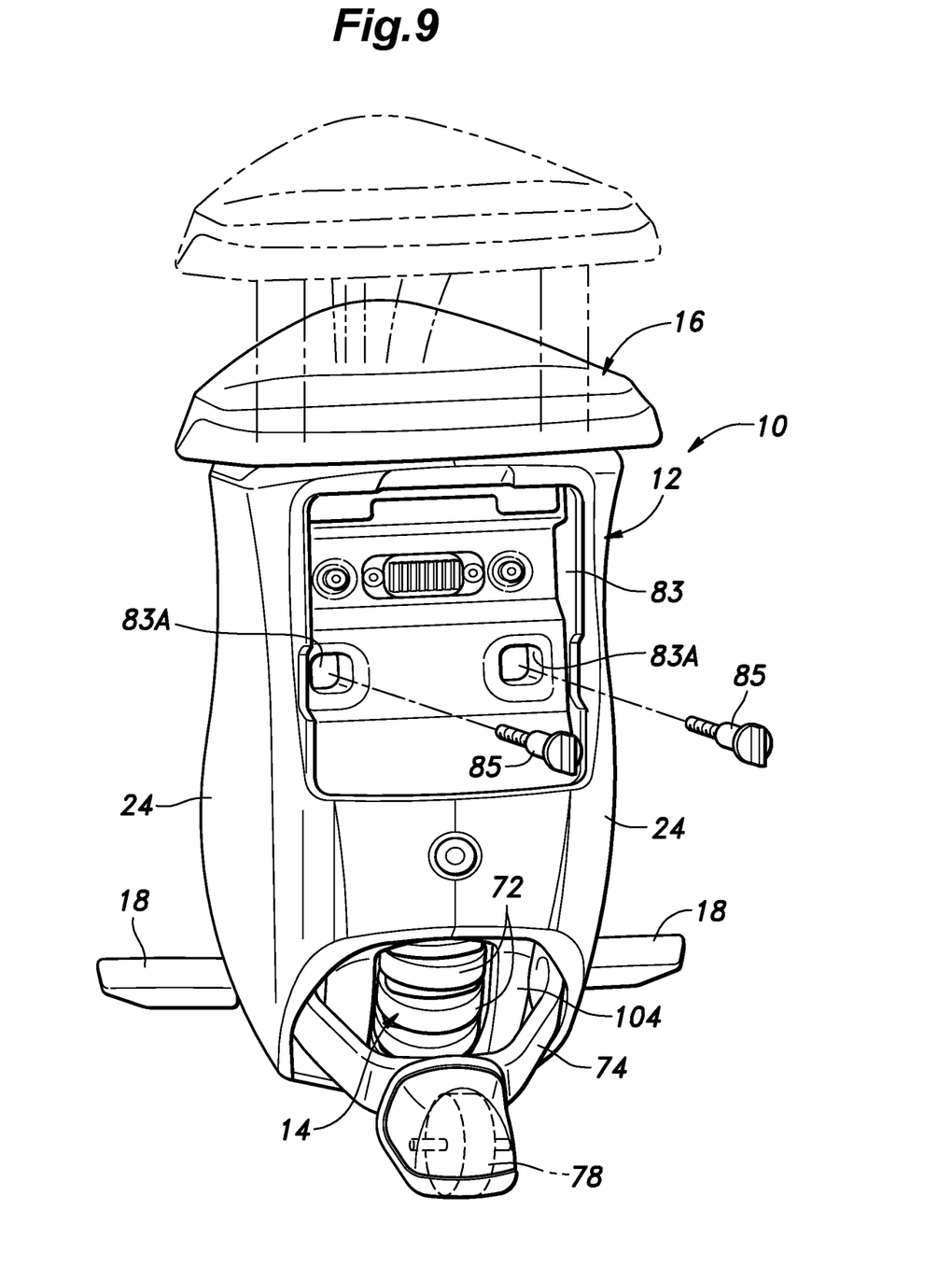
FIG. 9 is an exploded perspective view illustrating a procedure for adjusting the height of the seat.

The locking mechanism for selectively locking the saddle columns 94 to the main posts 34 includes a pair of threaded bolts 85 that are passed through openings 83A formed in the battery mounting plate 83 and threaded into threaded holes formed in the main posts 34 so that the saddle columns 94 may be fixed relative to the saddle columns by abutting the free ends of the threaded bolts 85 onto the respective saddle columns 94. The saddle columns may be formed with suitable recesses to ensure a positive engagement between the free end each threaded bolt 85 and the corresponding saddle column 94. The openings 83A of the battery mounting plate 83 are normally concealed by the battery pack 82, but can be made accessible by removing the battery pack 82.

As shown in FIGS. 1 and 2, the extension 92 moves vertically along the front wall 22B of the outer shell 12 when the vertical position of the saddle 16 is adjusted as discussed earlier. The extension 92 is provided with a tapering configuration such that the lateral dimension and the forward protrusion progressively diminishes toward the lower end thereon. The lateral sides 92A of the extension 92 are suitably contoured so as to be continuously connected to the side surfaces 90A of the saddle main part 90. In particular, the lateral width of the extension 92 progressively increases toward the rear side so that the lateral sides 92A of the extension 92 are smoothly connected to the adjoining parts of the surfaces of the side walls 24A of the outer shell 12.

Therefore, the lateral sides 92A, jointly with the front parts of the side surfaces 90A of the saddle main part 90, not only provides a guide surface for the rider in mounting and dismounting on and from the vehicle 10 but also provides a support for the rider who grips the extension 92 between the legs of the rider.

Figure 4:
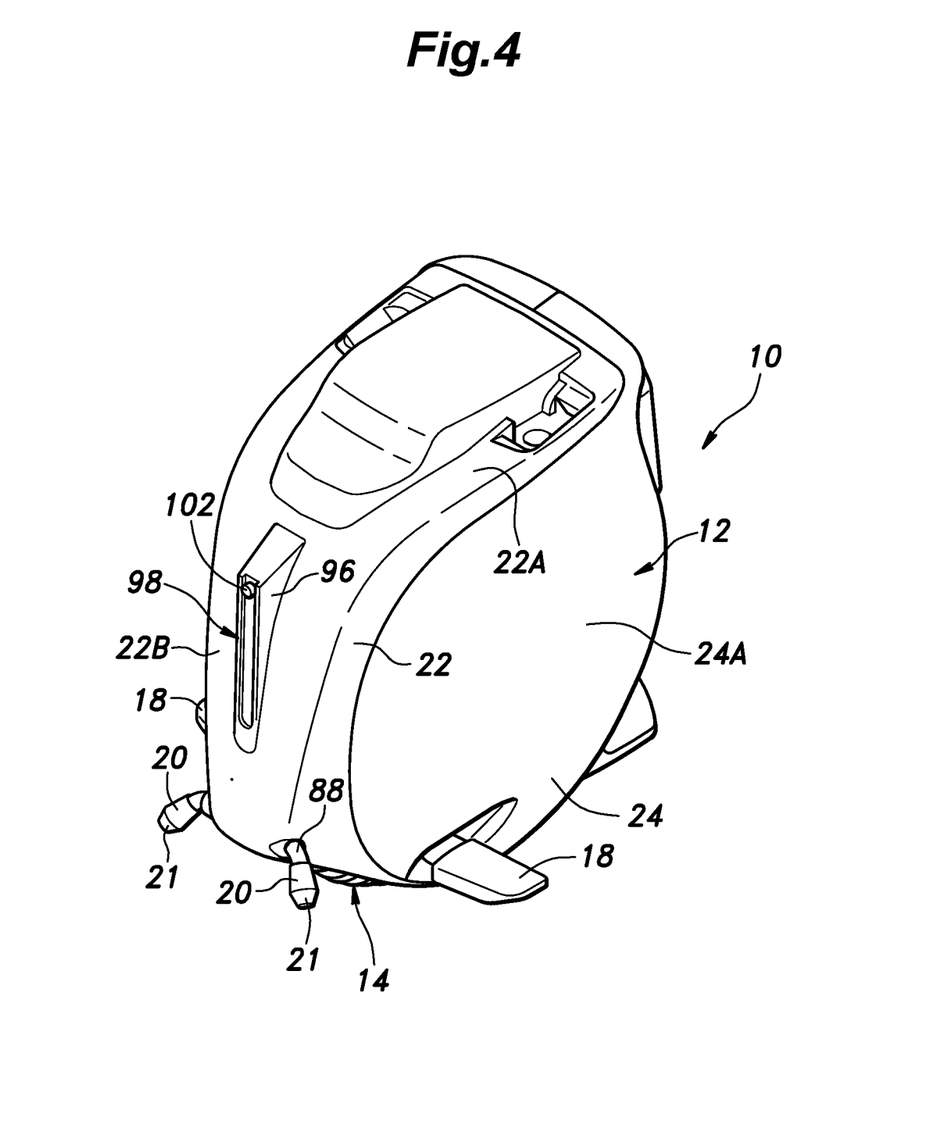
FIG. 4 is a view similar to FIG. 1 with the seat removed.
Figure 5:
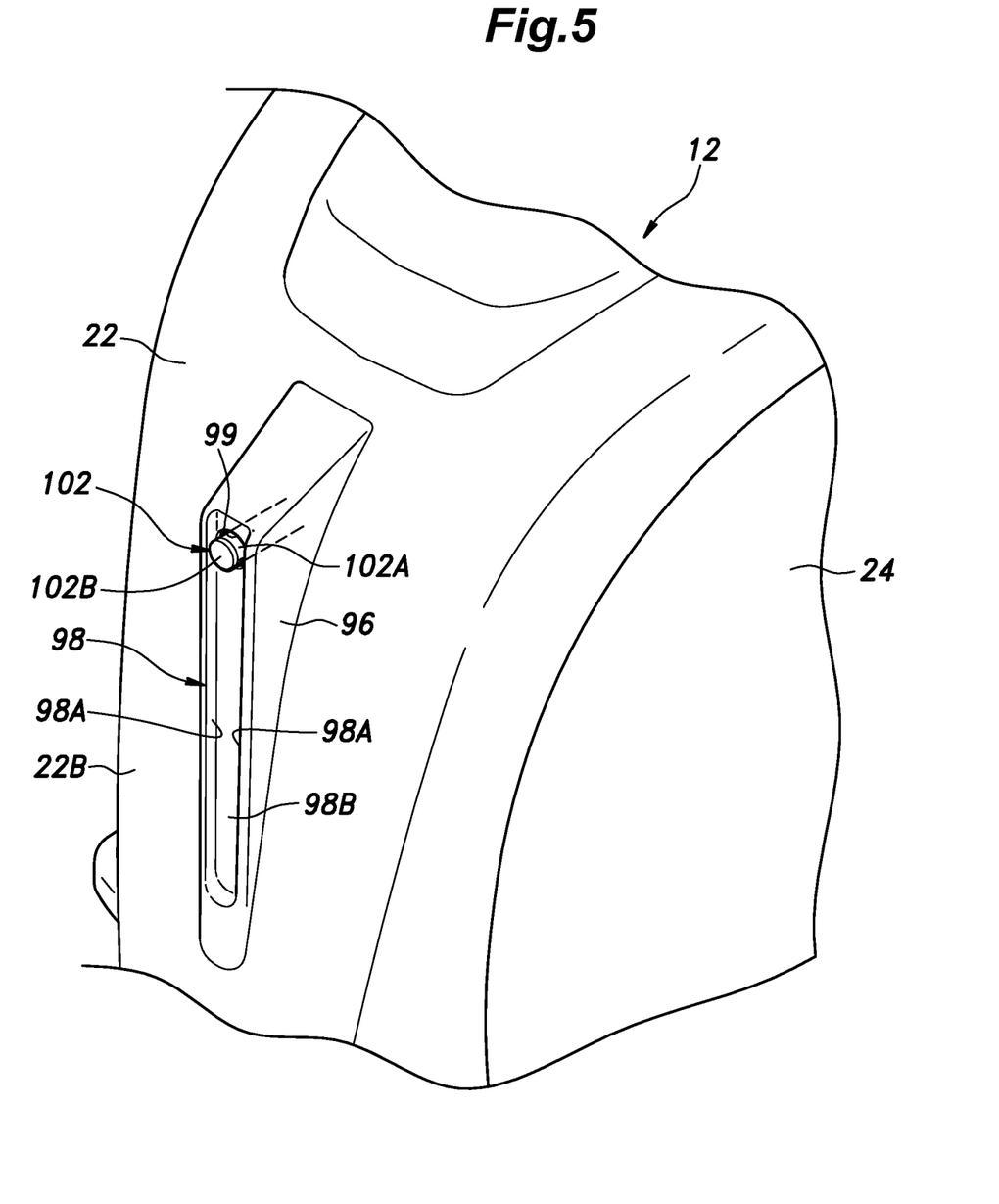
FIG. 5 is an enlarged view of a part of FIG. 4.
Figure 6:
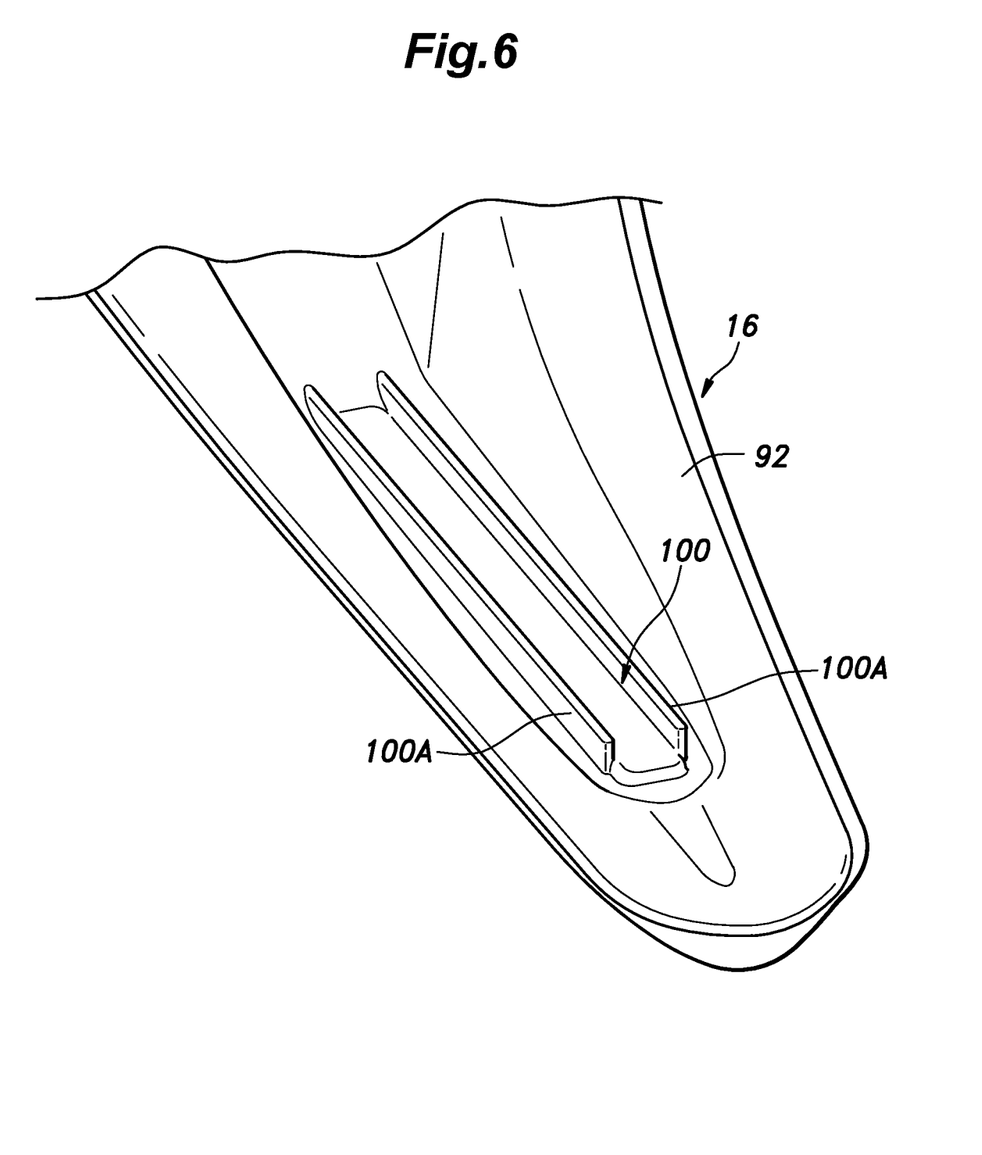
FIG. 6 is a fragmentary perspective view of an extension of the seat.

As shown in FIGS. 4 and 5, the main member 22 of the outer shell 12 is provided with a vertically elongated hollow protrusion 96 projecting from the front wall 22B of the main member 22. The hollow protrusion 96 includes a pair of ribs defining the respective side parts of the hollow protrusion 96 so that a vertically extending slot is defined between the ribs. These ribs form a first linear rail 98. As shown in FIG. 6, the back side of the extension 92 is integrally provided with a pair of ribs forming a second linear rail 100 in such manner that the outer sides 100A of these ribs are in sliding engagement with the inner sides 98A of the ribs forming the first linear rail 98.

Owing to the sliding engagement between the first linear rail 98 and the second linear rail 100, the vertical movement of the extension 92 can be accomplished in a stable manner, and the extension 92 is prevented from moving laterally relative to the outer shell 12. The sliding engagement between the first linear rail 98 and the second linear rail 100 also helps the vertical adjustment of the saddle 16 to be performed in a smooth manner in cooperation with the guide mechanism provided by the main posts 34 and the saddle columns 94. In particular, the twisting of the saddle 16 around the vertical axial line can be effectively prevented.

The protrusion 96 may be provided with wall parts that connect the upper ends of the ribs to each other and the lower ends of the ribs to each other so that a continuous peripheral wall is formed along the entire circumference of the protrusion 96. Thereby, the stiffness of the outer shell 12 can be effectively increased. The second linear rail 100 serves as stiffening ribs for the extension 92.

The vehicle body frame 30 is provided with a projection 102 projecting forward from the front center pipe 44. The projection 102 includes a main body 102A made of a metallic pipe having a base end welded to the front center pipe 44 and a plug 102B made of elastomer material such as rubber fitted into the free end (front end) of the main body 102A. The main body 102A is passed through an opening 99 passed through the bottom wall 98B of the protrusion 96, and projects beyond the front surfaces of the ribs of the protrusion 96 (the front surface of the first linear rail 98). The plug 102B abuts or opposes with a small gap the rear side of the extension 92.

Therefore, the impact of a frontal crash applied to the extension 92 is transmitted to the projection 102 which is firmly supported by the vehicle body frame 30. This prevents the impact from being transmitted to the outer shell 12. Because the free end 102A of the projection 102 is made of soft elastic material, the free end of the main body 102A is favorably protected from the impact, and the extension 92 is also protected from damages. The projection 102 also serves as a reinforcement against the lateral deflection of the protrusion 96.

Figure 10:
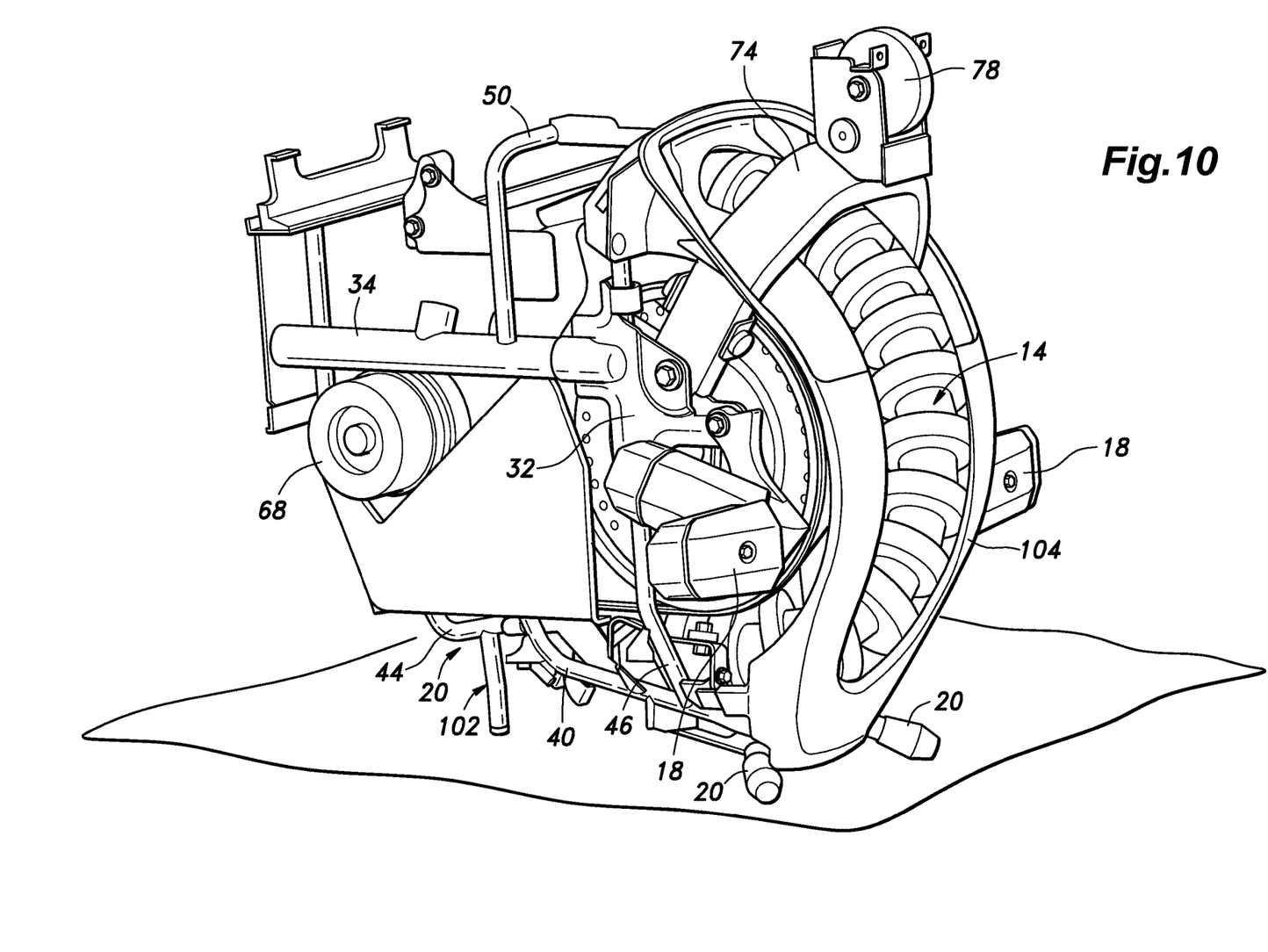
FIG. 10 is a side view of the internal structure of the inverted pendulum vehicle when the vehicle is in a front side down position.

As shown in FIG. 10, when the saddle 16 is removed, by laying the vehicle 10 with the front side down, the vehicle 10 can be supported on the ground surface at three points, or via the projection 102 and the stand legs 20, in a stable manner.

By positioning the vehicle 10 in this manner, the attachment and removal of the under cover 104 and other parts of the vehicle 10 can be performed in a favorable manner.

Although the present invention has been described in terms of a preferred embodiment thereof, it is obvious to a person skilled in the art that various alterations and modifications are possible without departing from the scope of the present invention.

The invention claimed is:

1. An inverted pendulum vehicle, comprising:
    a main wheel configured to be driven under an inverted pendulum control;
    a vehicle body frame supporting the main wheel;
    an outer shell covering the vehicle body frame; and
    a seat mounted on the vehicle body frame in a vertically adjustable manner for seating a rider of the vehicle;
    wherein the seat is provided with an extension extending downward therefrom along a front side of the outer shell, and the vehicle body frame is provided with a projection projecting forward from the vehicle body frame and passed through a front part of the outer shell, the projection being provided with a free end configured to contact or oppose with a certain gap a rear side of the extension.

2. The inverted pendulum vehicle according to claim 1, wherein the projection comprises a main body made of a metallic tube, and a plug made of elastomeric material and attached to a free end of the main body.

3. The inverted pendulum vehicle according to claim 1, wherein a guide mechanism is provided between the front side of the outer shell and the extension, the guide mechanism being configured to restrict a lateral movement of the extension relative to the outer shell, and permit a vertical movement of the extension relative to the outer shell.

4. The inverted pendulum vehicle according to claim 3, wherein the guide mechanism comprises a first linear rail extending vertically on the front side of the outer shell, and a second linear rail extending vertically on the extension opposite to the first linear rail and slidably engaged by the first linear rail.

5. The inverted pendulum vehicle according to claim 4, wherein the outer shell is provided with a pair of ribs extending vertically along the front side thereof, the first linear rail being formed by side surfaces of the ribs, the projection being positioned between the ribs, and projecting beyond front surfaces of the ribs.

6. The inverted pendulum vehicle according to claim 1, further comprising a pair of stand legs supported by the vehicle body frame and projecting forward from either side of a front part of the outer shell, and the projection is positioned and dimensioned such that the vehicle can be supported on a ground surface at the projection and the stand legs in a stable manner when the seat is removed from the vehicle.

7. The inverted pendulum vehicle according to claim 1, wherein the seat is provided with a column depending therefrom, and slidably retained by the vehicle body frame.

* * * * *